(12) United States Patent
Frohlich et al.

(10) Patent No.: US 6,650,811 B1
(45) Date of Patent: Nov. 18, 2003

(54) PROTECTION OF GLASS FIBERS FOR TELECOMMUNICATION WITH HOLLOW LEADS

(75) Inventors: Franz-Friedrich Frohlich, Hagen (DE); Peter Wallentowitz, Hagen (DE); Michael Stateczny, Ludenscheid (DE)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 09/720,313

(22) PCT Filed: Jun. 1, 1999

(86) PCT No.: PCT/DE99/01621

§ 371 (c)(1),
(2), (4) Date: Feb. 26, 2001

(87) PCT Pub. No.: WO99/67669

PCT Pub. Date: Dec. 29, 1999

(30) Foreign Application Priority Data

Jun. 23, 1998 (DE) .......................... 198 82 791

(51) Int. Cl.⁷ .............................. G02B 6/44; G02B 6/00
(52) U.S. Cl. ................... 385/100; 385/134; 385/137; 385/138
(58) Field of Search ................. 385/134–139, 385/100–114

(56) References Cited

U.S. PATENT DOCUMENTS

| | | | | |
|---|---|---|---|---|
| 3,830,667 A | * | 8/1974 | Carpenter | 156/155 |
| 4,029,390 A | * | 6/1977 | Chinnock et al. | 385/98 |
| 4,585,305 A | * | 4/1986 | Chazelas et al. | 385/134 |
| 5,109,460 A | * | 4/1992 | Baek et al. | 156/101 |
| 5,222,179 A | * | 6/1993 | Auteri | 385/114 |
| 5,231,685 A | * | 7/1993 | Hanzawa et al. | 385/139 |
| 5,239,609 A | * | 8/1993 | Auteri | 385/136 |
| 5,381,501 A | * | 1/1995 | Cardinal et al. | 385/134 |
| 5,625,737 A | * | 4/1997 | Saito | 385/137 |
| 5,649,042 A | * | 7/1997 | Saito | 385/109 |
| 5,694,510 A | * | 12/1997 | Sano et al. | 174/70 A |
| 5,761,361 A | * | 6/1998 | Pfandl et al. | 385/100 |
| 5,832,150 A | * | 11/1998 | Flint | 385/115 |
| 5,970,195 A | * | 10/1999 | Brown | 385/100 |
| 5,991,492 A | * | 11/1999 | Ota et al. | 385/137 |
| 6,195,489 B1 | * | 2/2001 | Oohashi et al. | 385/102 |
| 6,427,042 B1 | * | 7/2002 | Dyke et al. | 385/100 |

* cited by examiner

Primary Examiner—John D. Lee
Assistant Examiner—Daniel Valencia

(57) ABSTRACT

The invention relates to a protection for glass fibers for telecommunication with air-space paper-insulated core (H1 to Hn) in distribution fields arranged in the form of cassettes. Several air-space paper-insulated cores (H1 to Hn) are assembled according to their length in a composite element (VE1 to VE5), wherein the ends can be cut to the required length if necessary. The air-space paper-insulated acres (H1 to Hn) are assembled according to their length in a discontinued manner using connecting shaped parts or in a continuous manner along the generatrix of the air-space paper-insulated cores.

15 Claims, 5 Drawing Sheets

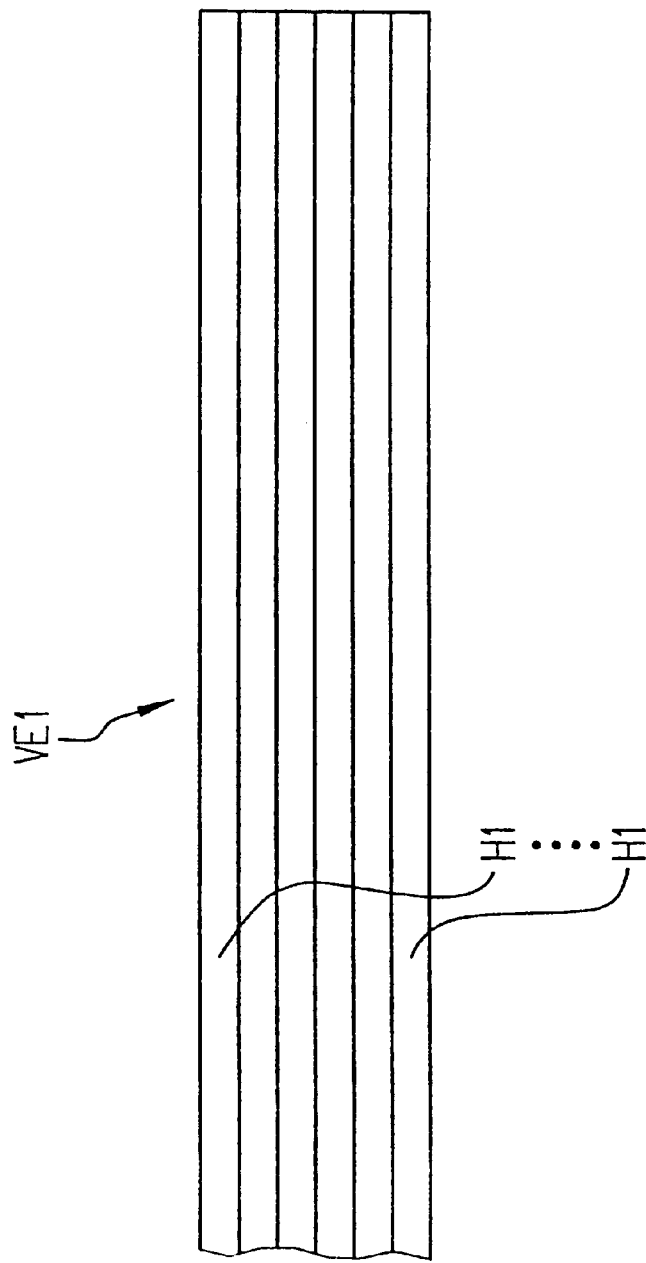

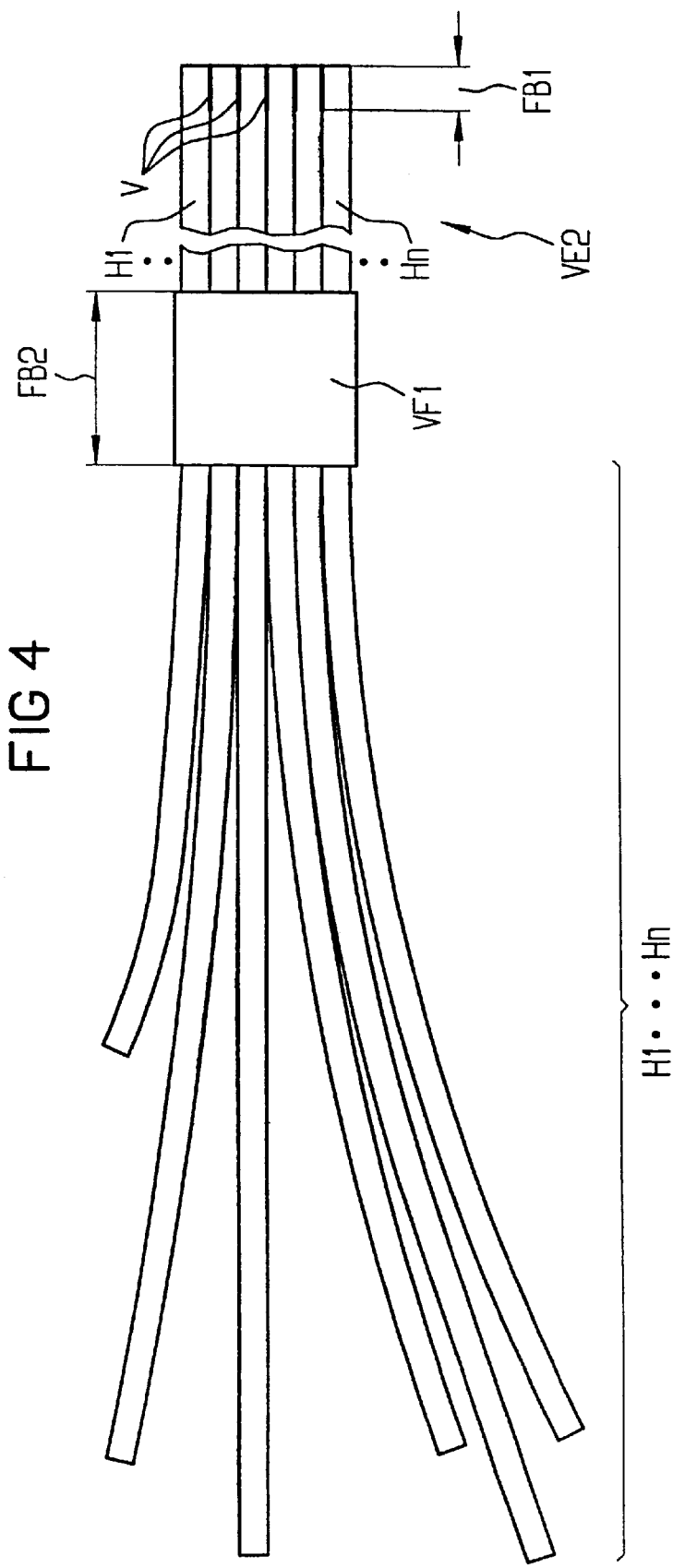

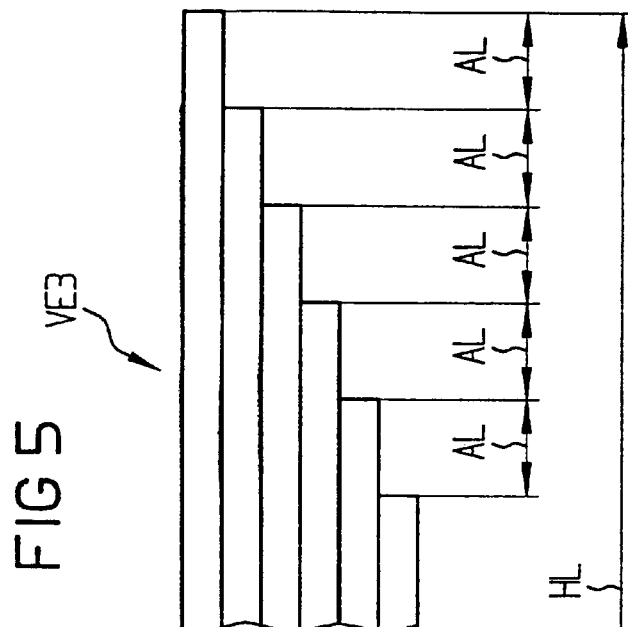
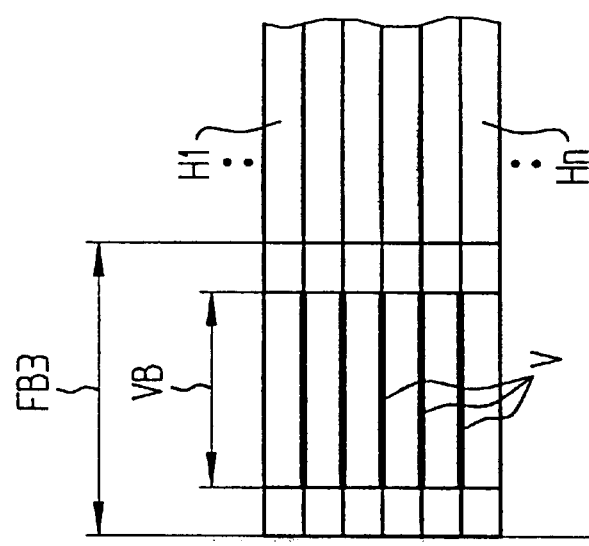
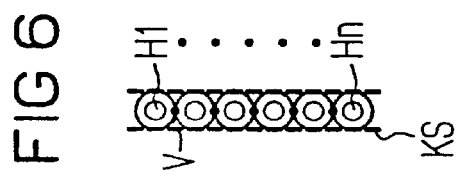

PROTECTION OF GLASS FIBERS FOR TELECOMMUNICATION WITH HOLLOW LEADS

The invention relates to a protection for glass fibers for telecommunication with hollow leads in distribution fields of cassette arrays in cable sleeves.

Up to now, glass fibers are generally fed into glass fiber cable bundle leads for splicing up to the commercial splicing cassettes and from there, are then fed further via the cables' own bundle leads into the exiting cable. If however more glass fibers are fed into a bundle lead than are to be spliced within a splice cassette, these glass fibers must be correspondingly split, i.e. they have to be removed from the bundle lead and, as the case may be, be fed within other suitable protective tubes. In one such splitting, a splitting adapter to which, for example, the tubes are individually attached is commonly used. In another exemplary technique a corresponding number of tubes lead directly out of the cassette. It is however sensible to protect the glass fibers which are fed out of the cassettes or out of the bundle lead against mechanical influences.

It is also generally known to route glass fibers in thin tubes, or so-called hollow leads, in the distribution field. However, this requires varying diameters and varying lengths of hollow leads. In addition, the hollow leads must be attached on both sides of the cassettes as well as at the end of the cable. In this sense, cassettes comprising clamp grooves for holding individual hollow leads are known. This then requires the installer at the construction site to, for example, group hollow leads belonging together into bundles and to attach these with cable connectors to the respective appropriate cassette. This procedure, however, entails a high degree of effort during assembly, since the hollow leads must first be cut to length from a supply roll, layed and individually attached. This is the general prior as it is currently applied in distribution fields.

The goal of the present invention is to provide a protection for glass fibers for telecommunication with which the degree of assembly complexity in making the distribution fields can be reduced. The posed goal is met with a protection for glass fibers for telecommunication with hollow leads of the type mentioned at the outset, in which multiple hollow leads are gathered together lengthwise to a composite element at at least their first ends, and in which the ends of the hollow leads can be individually cut off to the required length.

The embodiments according to the invention for the protection of glass fibers for telecommunication result in considerable work for the assembler, since connection elements which have already been gather for him are provided, which, as the case may be, are also individually cut to the required lengths. Gathering the individual hollow leads also results in a considerable simplification during the fixing of these composite elements since they can exit from a splitting point and can then be easily routed to the corresponding distribution points. These composite elements of gathered individual hollow leads can be designed as a round bundle or as a flat band. The composite or the gathering of the individual hollow leads can extend over the entire length required so that a continual composite exists. The assembler then opens the individual hollow leads at the end point or close to the end point of the composite, so that the hollow leads are routed starting from the opening point individually, for example, to different cassettes. Such a composite element can either be offered in endless form or can be cut to a particular length. However, according to the invention, composite elements are also provided in which the individual hollow leads are held together only at one point or discontinuously at multiple points with connection pieces or by gluing. For a given distributor sleeve, it is therefore basically possible to provide a composite element system exactly tailored to the laying requirements. For the assembler, a ready-made composite element system of this sort results in a considerable savings in assembly time, since the cutting to size, laying and fixing of individual hollow leads is eliminated.

The connection of the individual hollow leads along the surface lines can for example be accomplished by melting the outer covering layer followed by compression. Mutual gluing with thermal glues or with UV-curing glues, two-component glues or instant glues is also possible, wherein not only a discontinuous, but also a continuous composite can be produced. By co-extruding multiple hollow leads, it is possible even here to produce a corresponding composite.

A special material combination is required in the hollow leads suitable for such an application. A hard but elastic plastic such as for example polycarbonate (PC) in the inner area of the hollow lead is especially suitable for this, so that the hollow lead does not crimp and possibly damage the glass fibers. In the outer area, a soft, weakly adhesive layer, for example made of polyurethane, is applied by which the mutual adhesion of the hollow leads is enhanced.

The invention is now described in more detail by means of nine figures.

FIG. 2 shows a continuously adhering composite element in the shape of a band.

FIG. 3 shows the front view of the composite element of FIG. 2.

FIG. 4 shows a discontinuous composite element with a connection piece.

FIG. 5 shows a composite element with hollow leads already cut to length.

FIG. 6 shows the composite element of FIG. 5 in frontal view.

Figure 1:
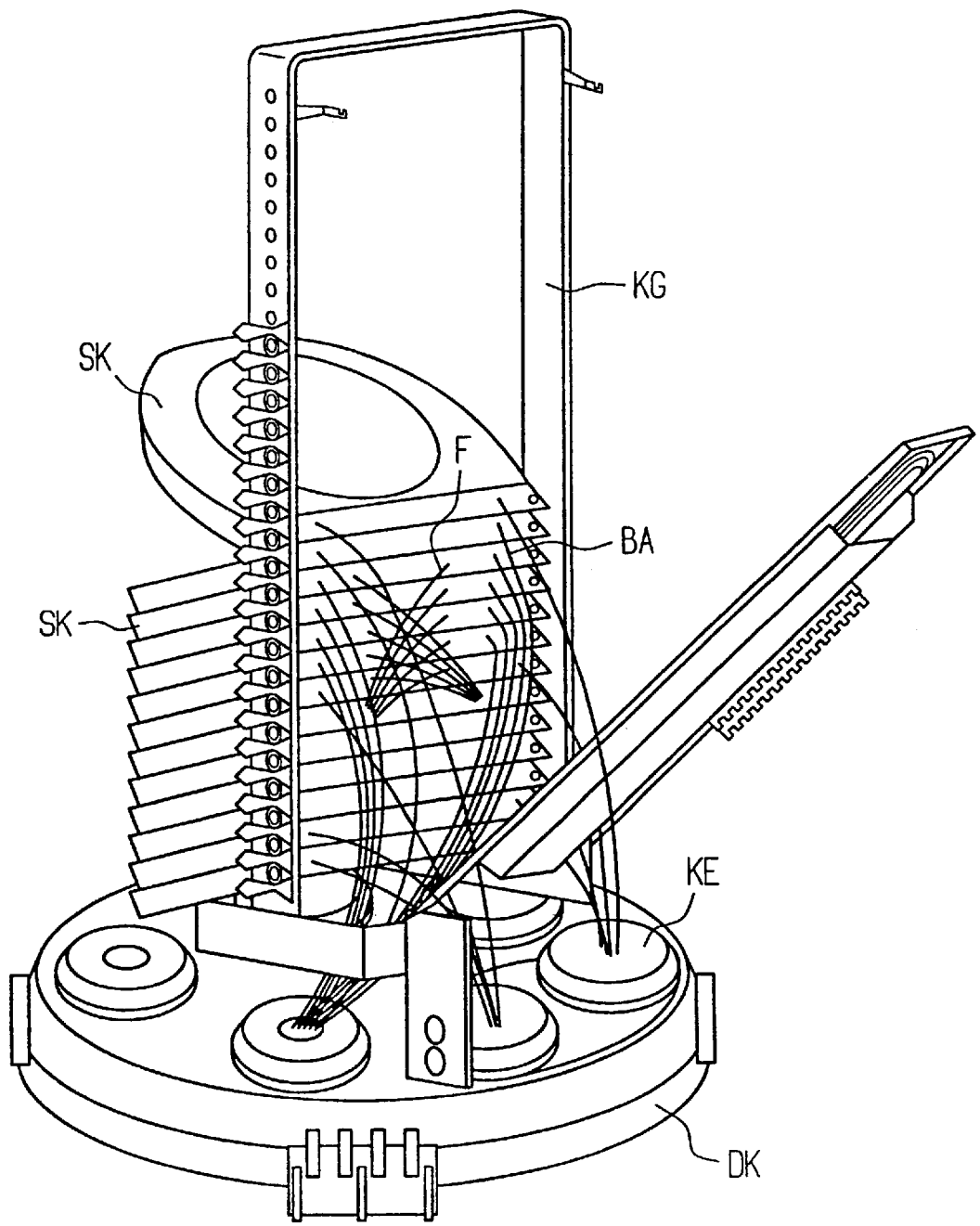
FIG. 1 shows the application of the protection according to the invention within a cable sleeve.

FIG. 1 shows the use of the protection for glass fibers for telecommunication with hollow leads as an embodiment. Shown here is a hood sleeve whose hood has, however, been removed, with a sealing body DK on which a cassette stand KG is mounted. Individual splice cassettes for splices of light wave conductors are hung in a hinged manner in this cassette stand KG. On the back side of the cassette stand KG is now located the distribution field for the glass fibers F and the bundle leads BA, wherein the latter are routed from the cable entrances KE to the individual splice cassettes. The individual glass fibers F which are routed between the individual splice cassettes SK as well as for example the bundle leads BA should be routed in a protected manner in order to avoid damage. According to the invention, the glass fibers F and/or the bundle leads BA are now provided with a protection made of composite elements according to the invention. Even this sketched representation makes clear that, relative to the use of individual hollow leads, the use of composite elements according to the invention allows the realization of considerable assembly savings. The designs of such composite elements are now described in more detail by means of the following figures.

FIG. 2 shows a band-shaped composite element VE1 according to the invention, in which individual hollow leads H1 to Hn are connected to one another over their entire length, wherein for each one the possibility exists to open the mutual connection of the hollow leads h1 to Hn at least at the ends. By means of the arrangement of the hollow leads in a composite element of this sort, it is possible that the attachment to at least the point of origin only takes place once for all individual elements, and that on the second end a splitting of the individual elements in different directions is possible.

FIG. 3 shows a front view onto the composite element VE1 of FIG. 2 with the hollow leads H1 to Hn. Here, it becomes clear that this picture is concerned with a band-like composite element VE1 in which connection between the individual hollow leads H1 to Hn takes place via lengthwise or elongated connections V. A necessary splitting of this composite element takes place along the connections V.

FIG. 4 imparts the construction of a composite element VE2 as a discontinuously gathered element with hollow leads H1 to Hn. Here, two variants are represented which can be used both in combination as well as individually. In this way, the mutual connection of the hollow leads H1 to Hn can be conducted at the first ends in a terminal fixing area FB1. In this way, the common starting point for an attachment is created. In the corresponding distance from this first fixing area, which is determined for example by a branching point, a connection piece VF1 is provided here in a second fixing area FB2, with which connection piece VF1 a further composite point is created. This connection piece VF1 can be made for example of a thermal glue which, under certain conditions, can first be displaced and then can be fixed by the influence of heat. In this case, a splitting of the composite element VE2 into the individual hollow leads H1 to Hn takes place after this connection piece VF1 so that, from here, a distribution to the corresponding part points can take place. If the length has not already been factory-determined, the hollow leads H1 to Hn can now be manually cut to length.

A composite element with hollow leads H1 to Hn is represented in FIG. 5 wherein for example the longest hollow lead length has already been factory-determined. By means of corresponding cut-off lengths, corresponding adaption lengths are cut off, once again for example in the factory. The individual hollow leads H1 to Hn are connected to one another in a connection area VB located in the fixing area FB3 of the first ends so that afterwards, a broad fanning out of the hollow leads H1 to Hn of the composite element VE3 can take place.

FIG. 6 shows the composite element VE3 according to FIG. 5 in frontal view with its hollow leads H1 to Hn arranged in a bandwise manner, Two variants are shown here as connection elements which can be alternatively used. It is possible to connect the respective individual hollow leads H1 to Hn to one another along surface lines with a connection element, for example with a glue. But it is also possible to connect the individual hollow leads H1 to Hn on one or both sides to one another with the help of an adhesive strip.

Figure 7:
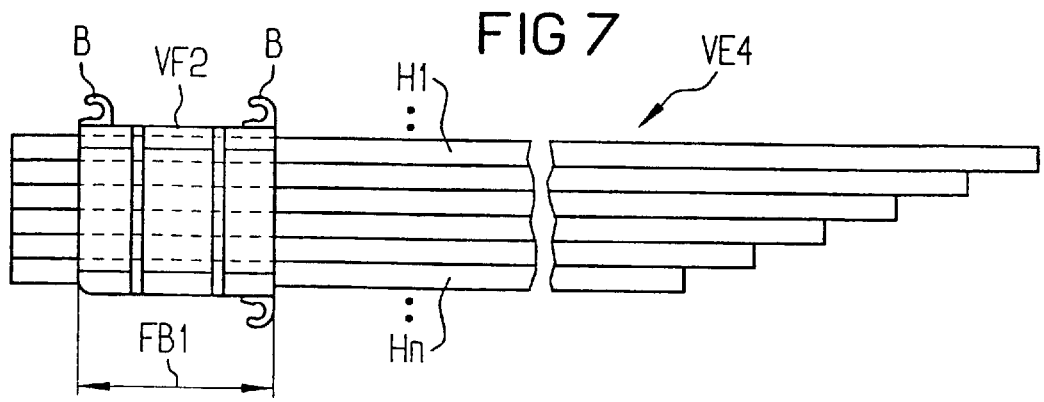
FIG. 7 shows a composite element with a connection piece and hollow leads cut to length.

FIG. 7 shows a similar composite element VE4, in which the individual H1 to Hn are held together with the help of a piece VF2 close to the first end in the fixing area FB4. This piece can be composed of plastic comprising corresponding grooves or recesses or holes into which the hollow leads H1 to Hn can be routed and fixed. In addition, the connection piece VF2 is provided with attachment means B, for example with hooks, with which the composite element can be fixed to a predetermined attachment point.

Figure 8:
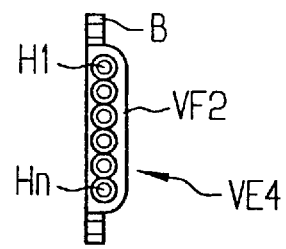
FIG. 8 shows a frontal view of the composite element of FIG. 7.

FIG. 8 shows the embodiment of FIG. 7 in front view, from which one can see that the individual hollow leads H1 to Hn are held in a band-shaped manner in openings of the connection piece VF2. In addition, the attachment means B of the composite element VE4 can be seen.

Figure 9:
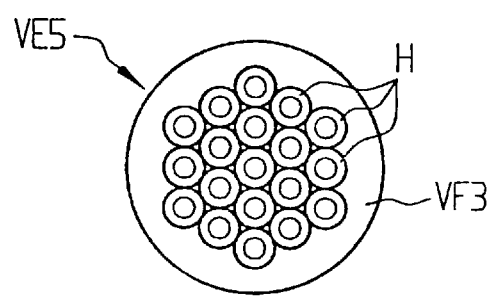
FIG. 9 shows a composite element of round bundle shape.

A composite element VE5 is shown in FIG. 9 in which the hollow leads H are gathered in such a way that a round cross sectional shape results with an encompassing connection piece VF3. Apart from that, all embodiments shown with regard to the attachments and the continuous as well as discontinuous connections can be applied to this composite element VE5, so that a further description is superfluous.

What is claimed is:

1. A composite element for protecting and routing glass fibers within a cable sleeve having a distribution field for connecting the glass fibers, the composite element comprising:

a plurality of hollow leads (H1 to Hn) arranged in the cable sleeve, the hollow leads being gathered together lengthwise and connected to one another at first end portions by elongated connections (V) provided between the hollow leads, the hollow leads being separated at second end portions opposite the first end portions and individually cut to a plurality of different predetermined lengths (HL); and a connection piece (VF) positioned at a longitudinal portion of the hollow leads between the first end portions and the second end portions, the connection piece completely encompassing the hollow leads.

2. A composite element according to claim 1, wherein multiple connection pieces (VF1) are provided, by means of which the hollow leads (H1 to Hn) are discontinuously connected to one another.

3. A composite element according to claim 1, wherein the elongated connections (V) are performed by gluing, along touching surface lines of the hollow leads (H1 to Hn).

4. A composite element according to claim 1, wherein the elongated connections (V) are performed by welding along touching surface lines of the hollow leads (H1 to Hn).

5. A composite element according to claim 1, wherein the elongated connections (V) are coherently produced by co-extrusion of the hollow leads (H1 to Hn).

6. A composite element according to claim 1, wherein the connection piece (VF) encompasses the hollow leads (H1 to Hn) in a positively locking manner.

7. A composite element according to claim 6, wherein the connection piece is composed of thermal glue.

8. A composite element according to claim 6, wherein the connection piece is a flexible strip of adhesive tape (KS).

9. A composite element according to claim 1, wherein the hollow leads (H1 to Hn) are formed as a round bundle.

10. A composite element according to claim 1, wherein the hollow leads (H1 to Hn) are formed as a flat band.

11. A composite element according to claim 1, wherein each of the hollow leads (H1 to Hn) is composed of a concentrically extending material combination comprising an inner area made of hard and elastic plastic and an outer area made of a soft, weakly adhesive layer.

12. A composite element for protecting and routing glass fibers within a cable sleeve having a distribution field for connecting the glass fibers, the composite element comprising:

a plurality of hollow leads (H1 to Hn) arranged in the cable sleeve, the hollow leads being gathered together lenghtwise and connected to one another at first end portions by elongated connections (V) provided between the hollow leads along touching surface lines at a first fixing area (FB1), the hollow leads being separated at second end portions opposite the first end portions and individually cut to a plurality of different predetermined lengths (HL); and a connection piece (VF) completely encompassing the hollow leads at a second fixing area (FB2) distant from the first fixing area, the first fixing area and the second fixing area providing connection areas for the hollow leads between the first end portions and the second end portions, the connection piece comprising attachment means (B) for fixing the composite element to a predetermined attachment point within the cable sleeve.

13. A composite element according to claim 12, wherein the hollow leads are formed as a rounded bundle.

14. A composite element according to claim 12, wherein the hollow leads are formed as a flat-band.

15. A composite element according to claim 12, wherein each of the hollow leads is composed of a concentrically extending material combination comprising an inner area made of hard and elastic plastic and an outer area made of a soft, weakly adhesive layer.

* * * * *